Oct. 30, 1956     R. W. HENKE     2,768,638

FLUID CHEMICAL TREATING SYSTEM

Filed July 12, 1954

*INVENTOR.*
RUSSELL W. HENKE

BY *Andrus & Scales*

Attorneys

United States Patent Office 2,768,638
Patented Oct. 30, 1956

2,768,638
FLUID CHEMICAL TREATING SYSTEM

Russell W. Henke, Milwaukee, Wis., assignor to Badger Meter Mfg. Company, Milwaukee, Wis., a corporation of Wisconsin Application July 12, 1954, Serial No. 442,841

8 Claims. (Cl. 137—98)

This invention relates to a fluid chemical treating system and more particularly to the container for supplying the treating fluid to be introduced into a second fluid.

According to the invention, a collapsible container for the treating fluid is disposed within a rigid casing which is connected to the fluid supply line into which the treating fluid is introduced.

An elastic tube pump for metering the treating fluid is driven by a motor operated by the flow of the second fluid. A pressure line extends from the fluid supply line at a location adjacent where the treating fluid enters, and interconnects the rigid casing and the pump chamber to provide an hydraulically balanced chemical feed system.

The drawings furnished herewith illustrate the best mode of carrying out the invention as presently contemplated and set forth hereinafter.

Figure 1:
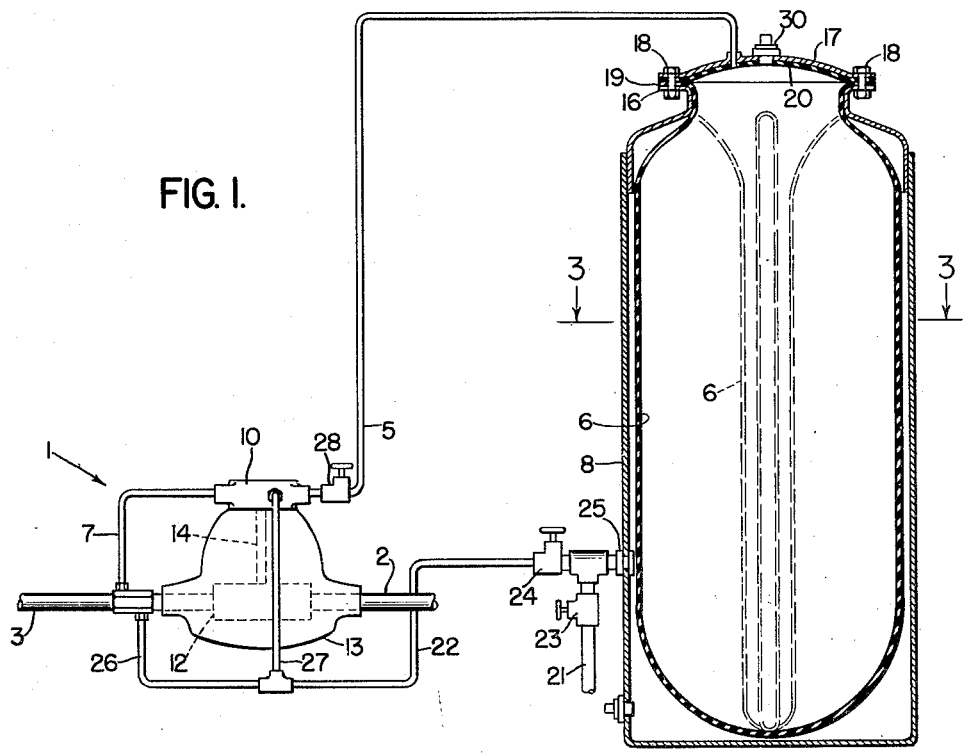
Figure 1 is a diagrammatic view of the treating system with the casing and container sectioned vertically and with the container opened as shown in full lines.
Figure 2:
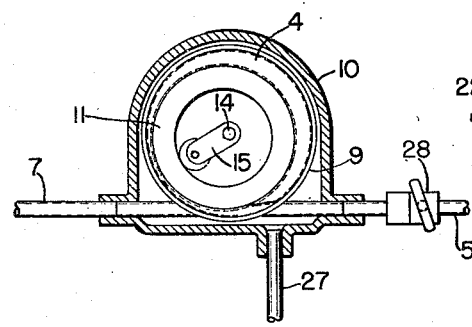
Fig. 2 is a horizontal section of the pump of the metering unit shown in Figure 1.
Figure 3:
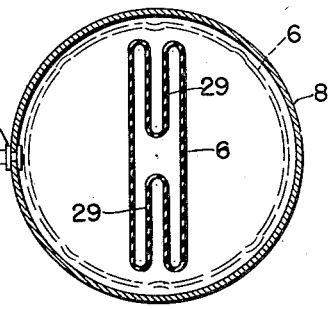
Fig. 3 is a section taken on line 3—3 of Figure 1 showing the container collapsed.

The metering unit 1 as shown in the drawings and disposed between the fluid supply line 2 and delivery line 3 includes the elastic tube 4 which connects the line 5 from the collapsible container 6 and the line 7 opening into the delivery line 3.

Container 6 is enclosed by the casing 8 and is adapted to be filled with the fluid treating chemical for delivery through lines 5 and 7 by the tube 4 into line 3. Tube 4 extends in a circle within the cylindrical member 9 in housing member 10 of the unit and between the circular cam 11 and the inner wall of the member 9.

Cam 11 moves in a circle within member 9 to express the treating fluid from tube 4 through line 7 into line 3 and is dimensioned to allow the elasticity of that part of the tube over which the cam has passed to resume its normal dimension and refill with the treating fluid from container 6 and line 7.

The fluid motor 12 enclosed within the lower housing 13 of unit 1 is connected to lines 2 and 3 and turns the shaft 14 which extends into upper housing member 10. Shaft 14 carries the arm 15 which moves cam 11 in fixed relation to the volume of fluid passing from line 2 through motor 12 into line 3 whereby the treating fluid from container 6 is added to hte fluid moving through lines 2 and 3 in a predetermined proportion which is maintanied irrespective of the volume of flow or pressure in lines 2 and 3.

The treating fluid is entirely contained within container 6 and in being added to the fluid in line 3 passes only through lines 5 and 7 and the tube 4 which parts only need to be resistant to the chemical action thereof.

The casing 8 is provided with an upper access opening defined by the flange 16 and includes the cover plate 17 adapted to be secured by the bolts 18 to flange 16 to close the casing.

Container 6 is of a flexible, chemically resistant material and is formed with an open upper flared end 19 which is secured by the bolts 18 between flange 16 and cover plate 17 to support the container within the casing. The lining 20 secured to the underside of plate 17 is of a material similar to that of container 6 to protect the plate against chemical action.

The drain conduit 21 and the pressure line 22 are provided with valves 23 and 24, respectively, and are connected to the fitting 25 in the side wall of casing 8 for communication therewith.

Pressure line 22 is connected by branch lines 26 and 27 with line 3 and upper housing member 10, respectively, whereby the static pressure within line 3 is maintained in housing member 10 and within casing 8 on the ouside of container 6.

Line 5 extends into container 6 through cover plate 17 and lining 20 to receive the treating fluid from within the container and includes the valve 28 carried by housing member 9 of the metering unit 1.

Container 6 is entirely secured within casing 8 by the upper end 19 of the container and is molded with the vertical pleats 29 so as to be normally collapsed within the casing. Upon filling, container 6 opens to fit within casing 8 with an appreciable clearance between the casing and as treating fluid is withdrawn from container 6 a corresponding volume of the fluid from line 3 passes without restriction through lines 26 and 22 into casing 8 so that the pressure in line 3 is always maintained in casing 8. Line 27 provides for the maintaining of the same pressure on the outside of tube 4 so that the flexible parts of the system are never subject to unequal pressures.

By closing valve 28 and the valve 24 in line 22, the plug 30 in plate 17 may be removed for filling the container. Before filling, the drain line 21 from casing 8 is opened by the valve 23 for draining the casing of the fluid received from line 3 through line 10 in the course of prior operation of the system. The drain line 21 is connected to casing 8 at a given height so that a predetermined amount of fluid remains trapped in the casing. After reclosing valve 23, the trapped fluid provides and assures a cushioned support of container 6 during and after refilling the container. Upon replacing plug 30 and reopening valves 24 and 28, the system is ready for continued operation.

Various modes of carrying out the invention are contemplated as within the scope of the following claims particularly pointing out and distinctly claiming the subject matter which is regarded as the invention.

I claim:

1. In a metering system, a collapsible container for a first fluid and having a rigid outer casing, an elastic circular tube and a closed housing therefor having first and second fittings respectively connecting one end of the tube with said container to receive the fluid therefrom and the other end with a line for the introduction of such fluid thereto, a positive displacement fluid motor interposed in said line and having a drive shaft extending into said housing and rotating in direct relation to the volume of flow of a second fluid through said line and motor, means in said housing and driven by said shaft to operate against said tube and cyclically express the fluid from the tube into the line, and a conduit connecting said line with said housing and casing for admitting said second fluid to the outside of the container within the casing and on the outside of the tube within the housing to maintain the container and tube at all times under equal pressure conditions whereby the tube will uniformly refill with the fluid from the container and a uniform amount of fluid will be uniformly expressed into the line with each cycle.

2. In a metering system, a collapsible container for a first fluid and having a rigid outer casing, a collapsible elastic tube, a closed housing therefor having first and second fittings respectively connecting one end of the tube with said container to receive the fluid therefrom and the other end with a line for the introduction of such fluid thereto, a positive displacement fluid motor interposed in said line and having a drive shaft extending into said housing and driven in direct relation to the volume of flow of a second fluid through said line and motor, means in said housing and driven by said shaft to operate against said tube and cyclically express the fluid from the tube into the line, and a conduit connecting said line with said housing and casing for admitting said second fluid to the outside of the container within the casing and on the outside of the tube within the housing to maintain the container and tube at all times under equal pressure conditions whereby the tube will uniformly refill with the fluid from the container and a uniform amount of fluid will be uniformly expressed into the line with each cycle.

3. In a metering system which includes a motor connected in a line and operated by the fluid passing therethrough and driving a pump connected to the line for introducing a treating fluid into the line fluid, a collapsible container for the treating fluid and having an upper annular outward flange defining an opening, a rigid casing having a rim defining an upper opening and carrying the flange of said container to support the same within the container, a cover member seated on the flange of said container to close the same and secured to the casing to effect the closure of the casing, a delivery conduit from said container to the pump, a conduit connecting said casing and line to equalize the pressure in the system, and a drain line from said casing for allowing refilling of the container and located a given height from the bottom of the casing whereby a predetermined amount of line fluid is retained within the casing to cushion and support the container in refilling the same with treating fluid.

4. In a system for introducing a quantity of fluid treating chemical into a given fluid and including supply and delivery lines for carrying the fluid to be treated under pressure, a rigid casing having an upper circular flange defining an opening and a cover plate secured to said flange and over said opening, a flexible normally collapsed pleated container having an upper open end secured between said flange and plate to suspend the container within the casing, said plate serving to close the container and having means to be opened for filling the container, means for withdrawing the chemical from said container and introducing the same into one of said fluid lines in predetermined proportions, a pressure line from said last named fluid line to said casing to maintain the fluid treating chemical under the same conditions of pressure as within the fluid line, and valve means controlling said last named line, said casing having a drain for refilling of the container upon closing said valve means and connected to said casing at a predetermined height from the lower end thereof to provide the hydraulic support of the container within the casing at all times.

5. In a storage device for a quantity of fluid to be introduced into a line under a given pressure, a rigid casing having an upper circular flange defining an opening and a cover plate secured to said flange and over said opening, a flexible normally collapsed pleated container having an upper open end secured between said flange and plate to suspend the container within the casing, said plate serving to close the container and having means to be opened for filling the container, means connected to said plate for withdrawing the fluid from said container, a pressure line from said first named line to said casing to maintain the fluid under the same conditions of pressure as within the line, and a drain for refilling of the container upon closing said pressure line and connected to said casing at a predetermined height from the lower end thereof to provide the hydraulic support of the container within the casing at all times.

6. In a storage device for a quantity of fluid to be introduced into a line under a given pressure, a closed rigid casing, a flexible normally collapsed container having an upper open end secured to the upper end of the casing and suspended therein, said casing having removable means to be opened for filling the container, and a conduit for withdrawing the fluid from said container, a pressure line from said first named line to said casing to maintain the fluid under the same conditions of pressure as within the line, and a drain for refilling of the container upon closing said pressure line and connected to said casing at a predetermined height from the lower end thereof so that a minimum of fluid is entrapped in the casing at all times to provide the hydraulic support of the container within the casing.

7. In a metering system for the introduction of a quantity of fluid to a second fluid in predetermined proportions and operated by the flow of the second fluid in a line under pressure, a collapsible container for the first fluid and having a rigid outer casing, a positive displacement expansible chamber fluid motor interposed in said line and having a drive shaft rotating in direct relation to the volume of flow through the motor and line, an elastic circular tube, a closed circular housing for said tube having corresponding ends of the tube connected respectively with said container to receive the fluid therefrom and with said line, means in said housing and driven by said shaft to operate against said tube and cyclically express the fluid from the tube into the line, and a pressure line connecting said housing and casing with said first named line to provide uniform refilling of the elastic tube regardless of the absolute pressure within the line.

8. In a treating fluid feed system for introducing a quantity of treating fluid in a second fluid according to a fixed ratio by volume, a supply line for carrying the fluid to be treated under pressure, a positive displacement motor interposed in said line and having a drive shaft rotating in direct relation to the volume flow through the motor and line, supply means for the treating fluid, an elastic circular tube, a closed circular housing for the tube and connecting corresponding ends of the tube with said container and with said line upstream from the fluid motor, means within said housing and driven by the fluid motor drive shaft progressively closing the tube to discharge the treating fluid into the supply line, and a pressure line connecting the housing and said supply means with the supply line to provide an hydraulically balanced feed system wherein the elastic tube is supplied with treating fluid at substantially the same pressure at which the treating fluid is entering the supply line.

References Cited in the file of this patent

UNITED STATES PATENTS

| | | |
|---|---|---|
| 2,252,939 | McCoy | Aug. 19, 1941 |
| 2,310,051 | Baer | Feb. 2, 1943 |
| 2,403,572 | Wittenberg | July 9, 1946 |